United States Patent
Yamaguchi et al.

(10) Patent No.: US 6,767,971 B1
(45) Date of Patent: Jul. 27, 2004

(54) MOLDING COMPOSITION

(75) Inventors: Takashi Yamaguchi, Wakayama (JP);
Kuniyasu Kawabe, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/643,259

(22) Filed: Aug. 22, 2000

(30) Foreign Application Priority Data

Sep. 1, 1999 (JP) .......................................... 11-247989

(51) Int. Cl.[7] .............................................. C08L 67/06
(52) U.S. Cl. ........................ 525/444; 525/44; 523/500; 523/539
(58) Field of Search ................... 525/444, 44; 523/500, 523/539

(56) References Cited

U.S. PATENT DOCUMENTS

| 4,895,895 A | * | 1/1990 | Osborne ....................... 525/28 |
| 5,212,234 A | * | 5/1993 | Van Gasse .................... 525/43 |
| 5,747,597 A | * | 5/1998 | Fujita .......................... 525/312 |
| 5,851,619 A | * | 12/1998 | Sakai ........................... 428/57 |

FOREIGN PATENT DOCUMENTS

| JP | A5755962 | 4/1982 |
| JP | A63221169 | 9/1988 |
| JP | A531362 | 2/1993 |
| JP | A5169475 | 7/1993 |
| JP | A71666 | 1/1995 |

* cited by examiner

Primary Examiner—Patricia A. Short
(74) Attorney, Agent, or Firm—Birch, Stewart, Kolasch & Birch, LLP

(57) ABSTRACT

A molding composition comprising a fibrous material, a crystalline unsaturated polyester, a non-crystalline unsaturated polyester, and a radical generator, and a molded article obtained by molding the molding composition are disclosed.

6 Claims, No Drawings

MOLDING COMPOSITION

BACKGROUND OF THE INVENTION

1. Field of the Invention

This invention relates to a molding composition suitable for production of sound absorbing interior automotive parts, heat insulating materials, sound absorbing materials for a soundproof chamber, sound absorbers of air conditioners, fiber-reinforced plastics (hereinafter "FRP"), constructional materials, and the like.

2. Description of the Related Art

Cores or soundproofing materials of automobile interior materials, sound absorbing materials for a soundproof chamber, sound absorbers of air conditioners, FRP, constructional materials, and the like are produced from molding compounds mainly comprising fiber, a urea formaldehyde resin, a melamine formaldehyde resin or a phenolic resin and an amine curing agent to secure sufficient strength (see, for example, JP-A-57-55962 and JP-A-7-1666). However, the urea formaldehyde resin and the like produce formaldehyde on forming and curing or thermal reaction, and the amine curing agent has the problem of smell.

In order to eliminate generation of formaldehyde and/or to improve the smell, a cured resin comprising an epoxy compound and a carboxylic acid or an anhydride thereof has been proposed as disclosed in JP-A-63-221169 and JP-A-5-31362. However, this combination requires a relatively high curing temperature. Many molded parts obtained from an unsaturated polyester combined with a radical generator are known, but most of them need a curing aid, such as styrene. Although they do not generate formaldehyde, the problem of smell remains unsolved. Molding compounds comprising a diallyl phthalate prepolymer and an unsaturated polyester are also known (see JP-A-5-169475). However, the diallyl phthalate prepolymer has a low iodine value and fails to achieve a high crosslinking density so that the resulting molded article has insufficient strength.

SUMMARY OF THE INVENTION

An object of the present invention is to provide a molded article having sufficient strength for practical use and improved safety and smell.

Another object of the present invention is to provide a molding composition suitable for producing such a molded article.

The present invention relates to a molding composition comprising (A) a fibrous material, (B) a crystalline unsaturated polyester, (C) a non-crystalline unsaturated polyester, and (D) a radical generator. The invention also relates to a molded article obtained by molding the molding composition.

The molding composition according to the invention provides a molded article with sufficient strength for practical use and free from the problems of formaldehyde generation and smell.

DETAILED DESCRIPTION OF THE INVENTION

A combined use of a crystalline unsaturated polyester (B) and a non-crystalline unsaturated polyester (C) reduces the respective softening points of the unsaturated polyesters. That is, each unsaturated polyester has a lower melt viscosity when used in combination than when used alone. Use of a radical generator (D) makes the molding composition cure without using a crosslinking assistant such as styrene that may cause the problems of smell and safety. As a result, not only are solved the problems of formaldehyde generation and smell, but the molding composition can cure in low temperature to provide a molded article equal or superior in strength to the conventional molding compositions comprising a urea formaldehyde resin, a phenolic resin, etc.

Reduction of curing temperature of a molding material and/or increase of curing rate could be achieved by combining an unsaturated polyester having a reduced melt viscosity and a radical generator having a moderate half-life temperature. In this case, however, reduction of melt viscosity of an unsaturated polyester merely by reduction of molecular weight results in reduction of strength of the resulting molded article due to the remaining low-molecular weight components such as monomers. In the present invention, by using a mixture of a crystalline unsaturated polyester and a non-crystalline unsaturated polyester, the melting point and the softening point of both the unsaturated polyester resins in thermal forming can be decreased. Therefore, the molding composition has a lowered melt viscosity without increasing low-molecular weight components so that is can be cured in lower temperature and/or at an increased curing rate to provide a molded article with enhanced strength.

While the details are unclear, it is generally said that a crystalline polyester is hard and brittle, while a non-crystalline polyester is tough. In the present invention the crystalline unsaturated polyester and the non-crystalline unsaturated polyester are combined to make an eutectic mixture, which is cured to provide a molded article with higher toughness than obtained with either one of them.

The term "crystalline unsaturated polyester" as used herein means a polyester having a clear endothermic peak indicative of a melting point in analysis with a differential scanning calorimeter (hereinafter "DSC"). The term "non-crystalline unsaturated polyester" as used herein denotes a polyester having no clear endothermic peak indicative of a melting point but an endothermic peak indicative of a glass transition point in analysis with a DSC. Whether an endothermic peak is indicative of a melting point or a glass transition point can easily be distinguished from the fact that the former remains while the latter disappears in second-scanning.

The crystalline unsaturated polyester as component (B) preferably has a melting point of 60° C. or higher so as not to aggregate at room temperature irrespective of the kind of an additive. The crystalline unsaturated polyester preferably has a lower melting point than 180° C., particularly lower than 150° C., so that it may cure sufficiently in a short molding time.

It is preferred for the non-crystalline unsaturated polyester as component (C) to have a softening point of 80° C. or higher and lower than 200° C., particularly lower than 150° C., and/or a glass transition point of 40° C. or higher and lower than 100° C., particularly lower than 90° C. The preference for the softening point and/or the glass transition point is based on the same reasons as for the melting point of the crystalline unsaturated polyester.

The difference between the melting point of the crystalline unsaturated polyester and the softening point of the non-crystalline unsaturated polyester is preferably 50° C. or smaller, particularly 40° C. or smaller, in order to easily form a eutectic mixture. Where two or more kinds of crystalline unsaturated polyesters and/or two or more kinds of non-crystalline unsaturated polyesters are used, it is preferred that the difference between the melting point of one of the crystalline unsaturated polyesters and the softening point of one of the non-crystalline unsaturated polyesters be within 50° C.

The crystalline unsaturated polyester and the non-crystalline unsaturated polyester can separately be ground to the respective desired particle sizes, followed by mixing up. Alternatively, mixing either in a powdered state or in a molten state may be followed by grinding to a desired particle size.

The crystalline or non-crystalline unsaturated polyesters are not particularly limited as long as they have an addition polymerizable unsaturated bond. For example, non-linear unsaturated polyesters comprising a monomer with tri- or higher functionality can be used. Polyester-polyamide which is obtained by modifying with a small amount (preferably 10 mol or less per 100 mol of a carboxylic acid component) of an amino-containing monomer is also employable as far as it has an addition polymerizable unsaturated bond.

The monomers providing the crystalline or non-crystalline unsaturated polyester are not particularly limited and include known di- or higher polyhydric alcohol components and known di- or higher polybasic carboxylic acid components, inclusive of their anhydrides, esters, etc. The di- or higher polyhydric alcohol components and the di- or higher polybasic carboxylic acid components are preferably used at a molar ratio of 1:0.9 to 1.1.

Preferred dihydric alcohol components include a bisphenol A-alkylene oxide adduct (containing 2 or 3 carbon atoms in the alkylene moiety; average mole number of alkylene oxide added: 1 to 16), ethylene glycol, propylene glycol, 1,6-hexanediol, 1,4-butanediol, bisphenol A, and hydrogenated bisphenol A. Preferred tri- or higher polyhydric alcohol components include sorbitol, 1,4-sorbitan, pentaerythritol, glycerol, and trimethylolpropane.

The dicarboxylic acid components include various dicarboxylic acids and succinic acid which is substituted with an alkyl or alkenyl group having 1 to 20 carbon atoms, anhydrides of these acids, and alkyl esters of these acids having 1 to 12 carbon atoms in the alkyl moiety thereof. Maleic anhydride, maleic anhydride, fumaric acid, terephthalic acid, and $C_{2-20}$ alkenyl-substituted succinic anhydride are preferred.

Preferred tri- or higher polycarboxylic acids include 1,2,4-benzenetricarboxylic acid (trimellitic acid), an anhydride thereof, and a $C_{1-12}$ alkyl ester thereof.

The essential addition-polymerizable unsaturated bond-containing monomers include fumaric acid, maleic acid, maleic anhydride, and itaconic acid. To secure the strength of molded articles, these unsaturated monomers are preferably used in an amount of at least 3% by weight based on the total monomers constituting the polyester.

The unsaturated polyester; either crystalline or non-crystalline, can be prepared by allowing a mixture comprising the above-described monomers to react at 150 to 250° C. for 5 to 20 hours in a nitrogen atmosphere. If necessary, the reaction is carried out under reduced pressure. Weather the resulting polymer is crystalline or non-crystalline depends on the kinds of the monomers and their mixing ratio. It is acceptable to use a monohydric alcohol component or a monocarboxylic acid component for molecular weight regulation, a commonly employed catalyst for esterification, such as dibutyltin oxide, for reaction acceleration, or a polymerization inhibitor, such as hydroquinone, for gelation prevention.

The unsaturated polyester-polyamide as referred to above is prepared from a monomer mixture comprising an amine monomer in addition to the above-mentioned alcohol component and the acid component. Examples of the amine monomers include various known polyamines, aminocarboxylic acids, amino alcohols, and lactams. Preferred amine monomers are ethylenediamine, hexamethylenediamine, xylylenediamine, and ε-caprolactam.

The fibrous material as component (A) is not particularly limited and includes inorganic fibers and organic fibers such as synthetic resin fibers and natural fibers. Organic fibers of cotton, flax, wool, silk, nylon, wood pulp, etc. are preferred from the standpoint of flexibility, heat insulation, and sound insulation of a molded article. These fibrous materials can be used either individually or as a mixture of two or more thereof. Component (A) can be used in the form of yarn or fabric, either woven or nonwoven.

The radical generator as component (D) which induces addition polymerization of the crystalline and the non-crystalline unsaturated polyesters include peroxides, persulfates, and azo compounds, with peroxides and persulfates being preferred. Lauroyl peroxide, dibutyl peroxide, dicumyl peroxide, sodium persulfate, and potassium persulfate are particularly preferred. It is preferred for the radical generator to have a half-life of 7 days or longer at 40° C. to secure the preservability, stability and the like of the molding composition. Taking the molding time into consideration, a still preferred half-life is within 10 minutes at 250° C.

If desired, the molding composition of the invention can contain known additives, such as a curing aid that is solid at room temperature and gives off little smell (e.g., a diallyl phthalate prepolymer), a lubricant (e.g., amide wax, synthetic wax, latices, or fatty acid metal salts), and a filler (e.g., talc, calcium carbonate or aluminum hydroxide), extenders, and so forth.

The molding composition of the invention is prepared by compounding the above-described components in a Henschel mixer, a fluidized bed mixer, and the like. It is desirable that the components other than component (A) be previously ground to an average particle size of 100 μm or smaller prior to compounding so that the resulting molded article can have uniform strength distribution, and component (A) be mixed into the mixture of the other components. In one of preferred embodiments, components (B) and (C) in a powder form, the radical generator, etc. are dispersed in water in the presence of a dispersant, such as a surface active agent, to prepare a water-born dispersion, which can be applied onto a substrate by spraying, etc. with improved wetting properties and adhesion to the substrate.

The compounding ratios of the components are not particularly limited as long as the molded articles obtained have sufficient strength for practical use. A preferred content of component (A) is 29 to 99% by weight, particularly 40 to 90% by weight, based on the total composition in order for the molded article to have excellent heat insulation and sound insulation and sufficient strength. A preferred total content of component (B) and component (C) is 0.5 to 70% by weight, particularly 5 to 50% by weight, based on the total composition from the viewpoint of the strength, heat insulation, and sound insulation of the molded articles. The proportion of component (B) in the total polyester, i.e., the total of components (B) and (C), is preferably 1 to 99% by weight, still preferably 10 to 99% by weight, particularly 20 to 80% by weight. That of component (C) in the total polyester is preferably 1 to 99% by weight, still preferably 10 to 90% by weight, particularly 20 to 80% by weight.

A preferred content of component (D) is 0.1 to 30% by weight, particularly 0.2 to 20% by weight, based on the total composition. The lower limit is preferred for preventing under cure and securing the strength of the molded articles. The upper limit is preferred for achieving a high crosslinking density and securing the strength of the molded articles.

The amounts of the additives optionally incorporated, such as a curing aid, a lubricant, and a filler, can be selected appropriately to obtain the desired effects.

Known molding methods can be adopted with no particularly restriction for obtaining molded articles of the present invention from the above-mentioned molding composition, such as compression molding, laminated molding, injection molding, and extrusion. The composition maybe preheated before molding or be heated in molding.

The molded article according to the invention preferably exhibits sufficient strength for practical use, preferably having a flexural strength of 160 kg/cm$^2$ or more, as measured in accordance with JIS K6911. The molded article of the invention is also excellent in safety, generating no formaldehyde, and gives off no smell. It is therefore suited for use as sound absorbing interior automotive parts, heat insulating-materials, sound absorbing materials for a soundproof chamber, sound absorbers of air conditioners, FRP, constructional materials, and the like.

The present invention will now be illustrated in greater detail with reference to Preparation Examples and Examples, but it should be understood that the invention is not limited thereto. Unless otherwise noted, all the parts are by weight.

In Preparation Examples, the melting point and the glass transition point were measured with a differential scanning calorimeter DSC210 manufactured by Seiko Denshi K.K. at a rate of temperature rise of 10° C./min and calculated by the onset method. The softening point was measured with a Koka type flow tester manufactured by Shimadzu Corp. under conditions of a load of 20 kgf, an orifice diameter of 10 mm, an orifice length of 1 mm, and a rate of temperature rise of 3° C./min. The temperature at which half the amount of a sample flows out of the orifice was taken as a softening point.

PREPARATION EXAMPLE 1

A mixture of 74 parts of ethylene glycol, 1233 parts of 1,4-butanediol, 1659 parts of fumaric acid, 146 parts of trimellitic anhydride, and 1.5 parts of dibutyltin oxide was allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a crystalline unsaturated polyester resin having a melting point of 111° C. The resin was ground to an average particle size of 100 μm (designated polyester 1).

PREPARATION EXAMPLE 2

A mixture of 5250 parts of a bisphenol A-PO adduct (average number of moles added: 2.1), 1372 parts of maleic anhydride, and 130 parts of trimellitic anhydride was allowed to react at 160° C. for 4 hours in a nitrogen atmosphere. The temperature was raised up to 200° C., and the reaction was continued under atmospheric pressure for 5 hours and then under reduced pressure of 9.33 kPa for 2 hours. The resulting resin was found to be a non-crystalline unsaturated polyester resin having a softening point of 95° C. and a glass transition point of 53° C. The resin was designated polyester 2.

EXAMPLES 1 TO 3 AND COMPARATIVE EXAMPLES 1 TO 2

Polyester 1, polyester 2, dicumyl peroxide (radical generator) ground to 100 μm or smaller, and a fibrous material (flax:cotton=2:3 by weight) in the form of pieces of threads were compounded in the ratio shown in Table 1 below to prepare a molding compound.

The compound was put in between mirror-finished stainless steel plates, placed in a hot press set at 180° C. or 190° C. and hot pressed under pressure of 1.47 MPa for 1 minute to obtain a molded article having a thickness of about 6 mm.

The molded article was evaluated in a normal temperature bend test in accordance with JIS K-6911. Further, the smell of the molded article put on a hot plate at 100° C. was organoleptically evaluated by a panel of 20 testers. A sample judged to have an offensive smell by none or one of the testers was graded "good", and a sample judged to have an offensive smell by more than one testers was grated "bad". The results of the evaluation are shown in Table 1. When the molded article was kept in a desiccator for 24 hours, and the gas was sucked from the desiccator after 24 hours, no formaldehyde was detected with a formalin gas detection tube.

TABLE 1

| | Molding Composition (part) | | | | Molding | Physical Properties of Molded Article | |
|---|---|---|---|---|---|---|---|
| | Fibrous material | Polyester 1 | Polyester 2 | Dicumyl Peroxide | Temp. (° C.) | Smell | Normal temperature Bending Strength (kgf/cm$^2$) |
| Example 1 | 70 | 15 | 15 | 1.5 | 190 | Good | 210 |
| Example 2 | 70 | 15 | 15 | 1.5 | 180 | Good | 200 |
| Example 3 | 70 | 20 | 10 | 1.5 | 190 | Good | 200 |
| Compara. Example 1 | 70 | 30 | — | 1.5 | 190 | Good | 140 |
| Compara. Example 2 | 70 | — | 30 | 1.5 | 190 | Good | 130 |

It is seen from the results in Table 1 that the molded compositions of Examples 1 to 3 which comprise a blend of polyester 1 (crystalline unsaturated polyester) and polyester 2 (non-crystalline unsaturated polyester) provide molded articles with improved strength even when cured at a low temperature of 180 to 190° C. as compared with the comparative molding compositions of Comparative Examples 1 and 2 which comprise either polyester 1 or polyester 2. The molded articles of Examples 1 to 3 were free from the unpleasant odor as given off from such conventional resins as phenolic resins.

While the invention has been described in detail and with reference to specific examples thereof, it will be apparent to one skilled in the art that various changes and modifications can be made therein without departing from the spirit and scope thereof.

What is claimed is:

1. A molding composition comprising (A) a fibrous material, (B) a crystalline unsaturated polyester, (C) a non-crystalline unsaturated polyester, and (D) a radical generator, and wherein the non-crystalline unsaturated polyester has at least one of a softening point of 80° C. or higher and lower than 200° C. and a glass transition point of 40° C. or higher and lower than 100° C., and wherein the crystalline unsaturated polyester has a melting point of 60° C. or higher and lower than 180° C. and wherein the difference between the melting point of the crystalline unsaturated polyester and the softening point of the non-crystalline unsaturated polyester is 50° C. or smaller and wherein said molding composition has a flexural strength of 160 kgf/cm2 or more when measured in accordance with JIS K6911 and wherein said composition is substantially free of styrene.

2. A molding composition according to claim 1, which comprises 29 to 99% by weight of the fibrous material, 0.5 to 70% by weight, in total, of the crystalline unsaturated polyester and the non-crystalline unsaturated polyester, and 0.1 to 30% by weight of the radical generator.

3. A molding composition according to claim 1, wherein said composition contains 10 to 90% by weight of the crystalline unsaturated polyester and 90 to 10% by weight of the non-crystalline unsaturated polyester based on the total of the crystalline unsaturated polyester and the non-crystalline unsaturated polyester.

4. A molded article obtained by molding the molding composition according to claim 1.

5. A molded article according to claim 4, which has flexural strength of 160 kgf/cm$^2$ or more.

6. An article made of the composition according to claim 1, wherein the article is selected from the group consisting of a sound absorbing interior automotive part, heat insulating materials, sound absorbing material for a soundproof chamber, a sound absorber of an air-conditioner, a fiber-reinforced plastic, and constructional material.

* * * * *